(12) United States Patent
Ong

(10) Patent No.: US 7,877,959 B2
(45) Date of Patent: Feb. 1, 2011

(54) CONNECTOR

(76) Inventor: Chin Chai Ong, 32 Winterbell Court, Churchlands (AU) 6018

(*) Notice: Subject to any disclaimer, the term of this patent is extended or adjusted under 35 U.S.C. 154(b) by 1065 days.

(21) Appl. No.: 10/504,347

(22) PCT Filed: Feb. 14, 2003

(86) PCT No.: PCT/AU03/00198

§ 371 (c)(1),
(2), (4) Date: Apr. 26, 2005

(87) PCT Pub. No.: WO03/069216

PCT Pub. Date: Aug. 21, 2003

(65) Prior Publication Data

US 2005/0271467 A1    Dec. 8, 2005

(30) Foreign Application Priority Data

Feb. 14, 2002  (AU) .............................. 2002100117
Oct. 16, 2002  (AU) .............................. 2002952080

(51) Int. Cl.
*E04C 2/40* (2006.01)
*E04C 2/32* (2006.01)
*E04C 2/38* (2006.01)

(52) U.S. Cl. .......................... 52/792.1; 52/245; 52/335; 52/478; 52/581; 52/588.1; 52/783.11; 52/792.11; 52/86

(58) Field of Classification Search .......... 52/518–523, 52/478, 588.1, 542, 840, 844, 848, 86–88, 52/245, 333–338, 528–531, 537–538, 544–547, 52/459–460, 467–468, 470, 581, 550, 792.1–792.11, 52/783.11, 783.19, 798.1
See application file for complete search history.

(56) References Cited

U.S. PATENT DOCUMENTS

| 11,292 | A | * | 7/1854 | Outcalt | .................. 52/465 |
| 2,033,422 | A | * | 3/1936 | Fernandez | ................ 52/528 |
| 3,323,269 | A | * | 6/1967 | Widdowson | ........... 52/573.1 |
| 4,296,581 | A | * | 10/1981 | Heckelsberg | ........... 52/520 |
| 4,358,916 | A | * | 11/1982 | Lacasse | ................. 52/630 |
| 4,505,084 | A | * | 3/1985 | Knudson | ................. 52/528 |

(Continued)

FOREIGN PATENT DOCUMENTS

DE    29821624 U    7/1999

(Continued)

*Primary Examiner*—Jeanette E. Chapman
(74) *Attorney, Agent, or Firm*—David A. Guerra

(57) ABSTRACT

A panel connector for interconnecting adjacent panels, wherein the panels have one or more flanges each having an edge. The connector comprises a portion of sheet material arranged to extend from the edge of the panel with a curved profile having an inner end adjacent the edge of the panel and an outer end. In transverse cross section, the curved profile includes a first portion extending from the inner end in a generally elliptical path and a second portion extending from the first portion to the outer end. The second portion curves inwardly from the generally elliptical path and the curved profile of the connector curves through at least 360 degrees. The second portion defines an opening between the inner end and the outer end to receive a portion of a further connector on an adjacent panel of the same shape.

20 Claims, 18 Drawing Sheets

U.S. PATENT DOCUMENTS

| | | | | |
|---|---|---|---|---|
| 4,843,793 | A * | 7/1989 | Ayers | 52/169.12 |
| 5,608,998 | A * | 3/1997 | Hume | 52/245 |
| 5,980,156 | A * | 11/1999 | Morello et al. | 405/151 |
| 6,341,464 | B1 * | 1/2002 | Dickey et al. | 52/547 |
| 6,543,197 | B2 * | 4/2003 | Wetzel et al. | 52/581 |
| 7,013,612 | B2 * | 3/2006 | Haddock | 52/545 |
| 7,647,737 | B2 * | 1/2010 | Morello | 52/245 |

FOREIGN PATENT DOCUMENTS

| | | |
|---|---|---|
| GB | 2131856 A | 6/1984 |
| GB | 2293189 A | 5/1996 |

* cited by examiner

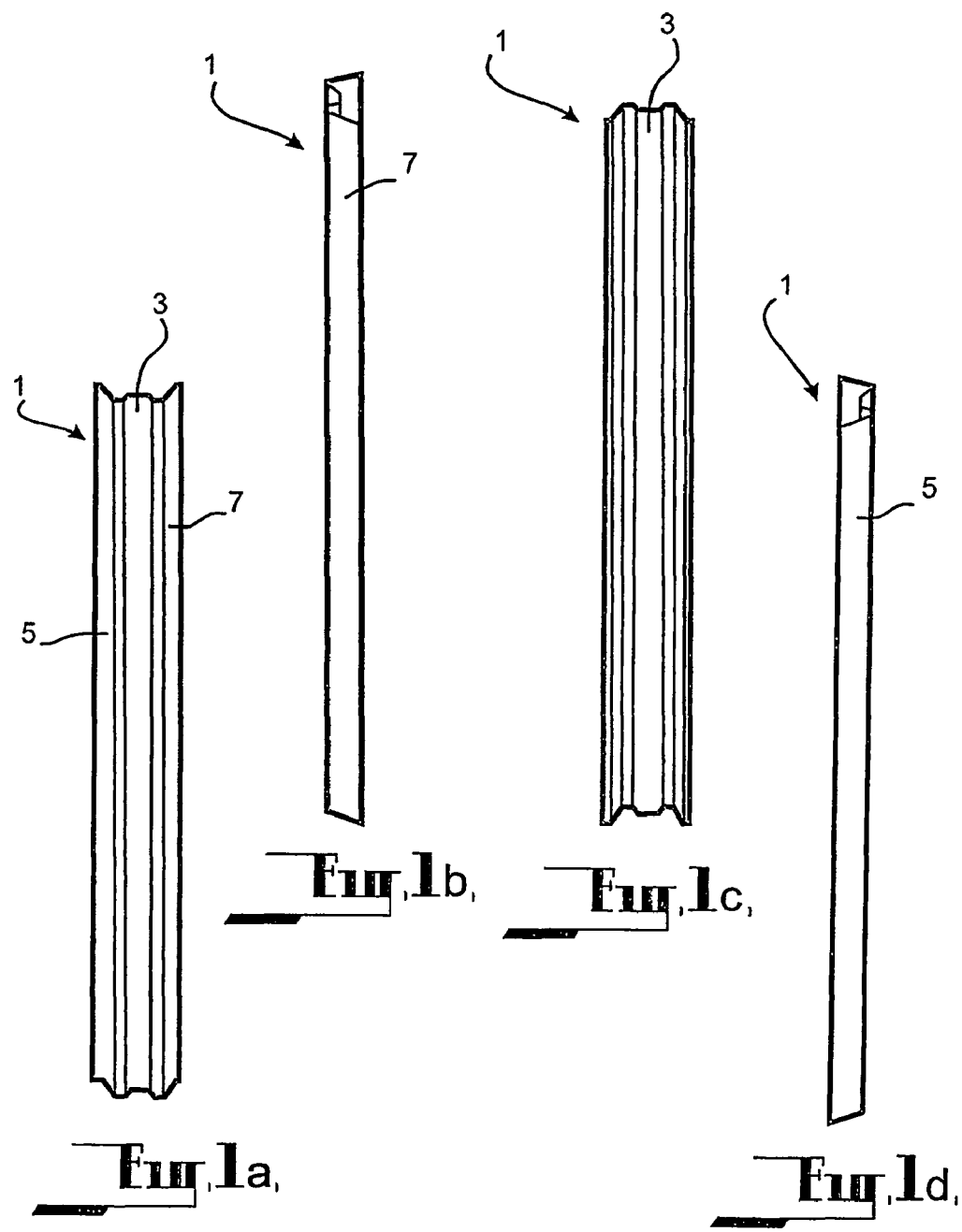

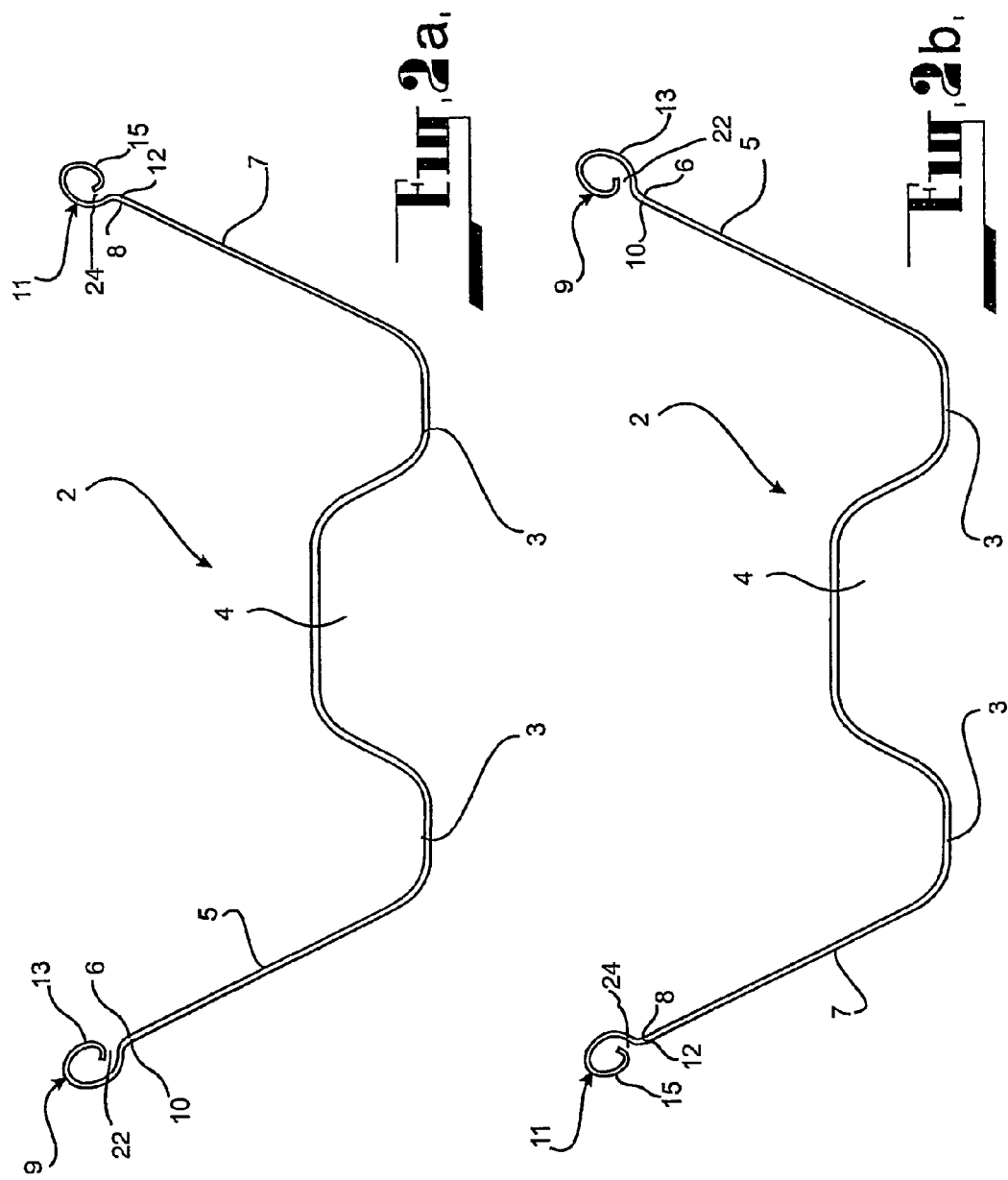

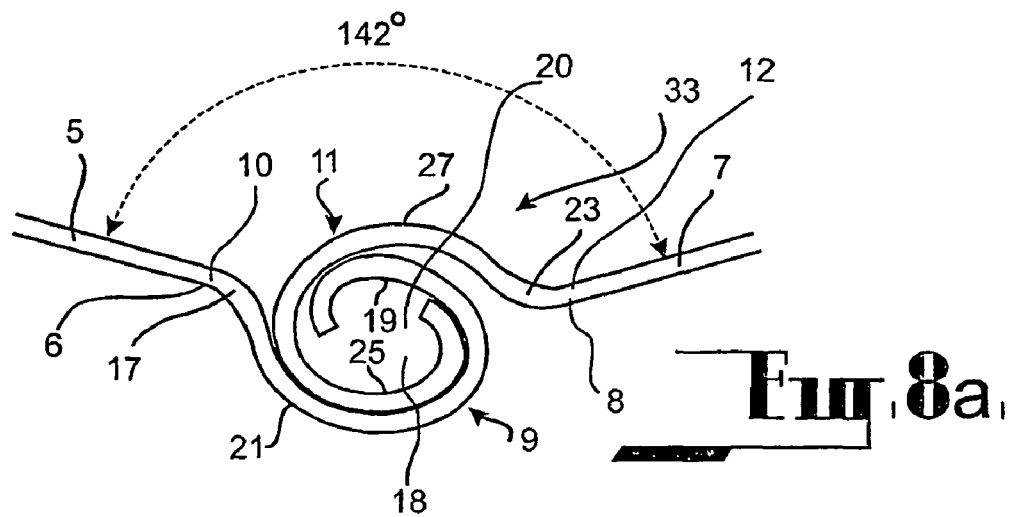
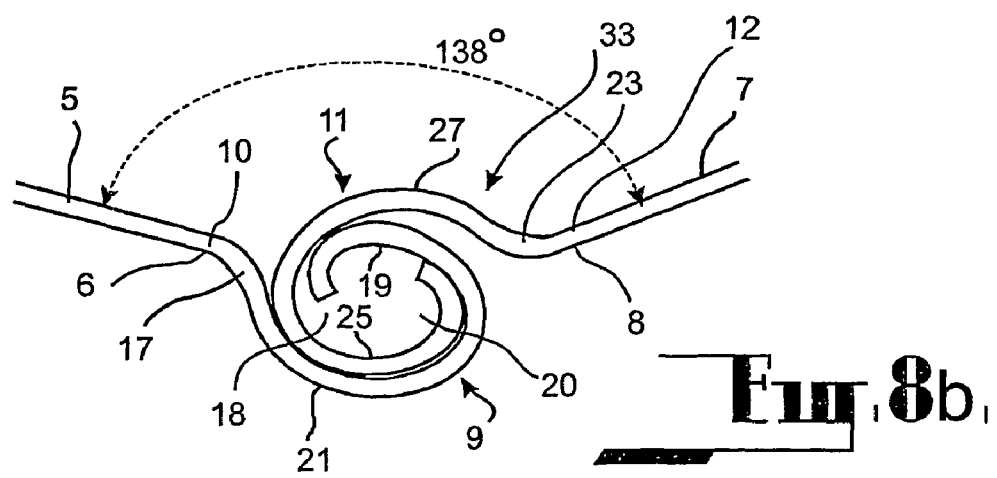
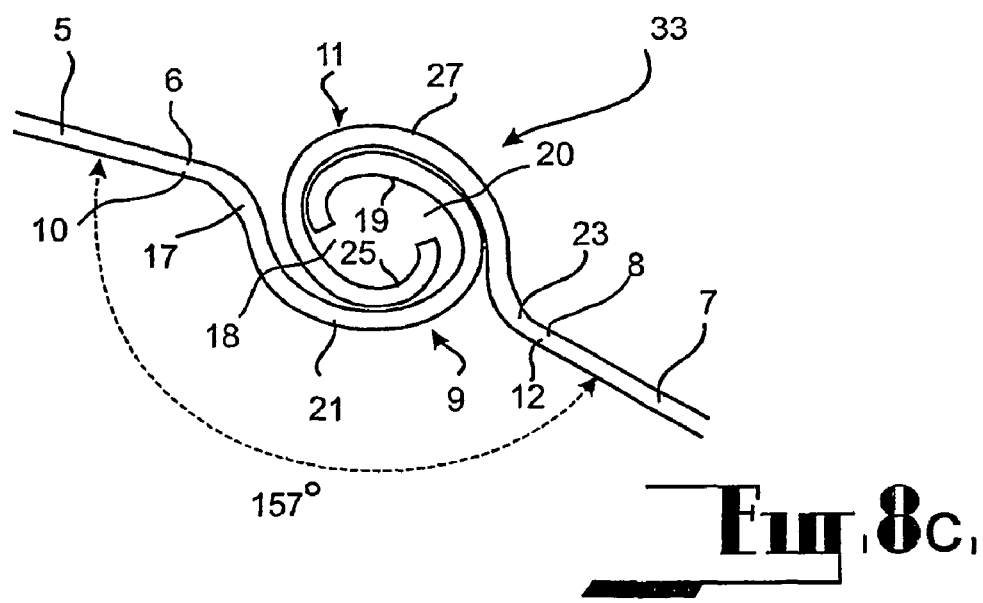

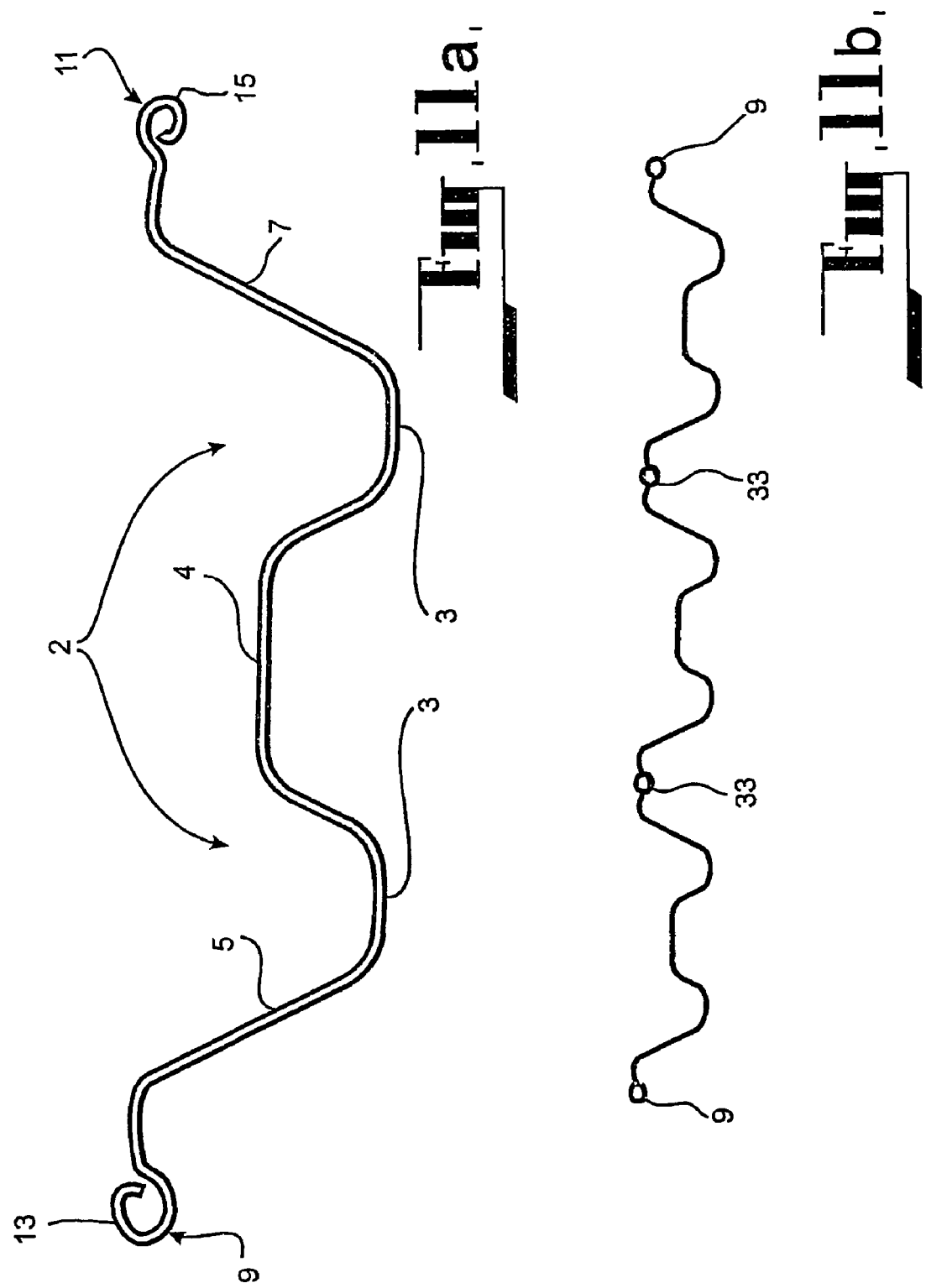

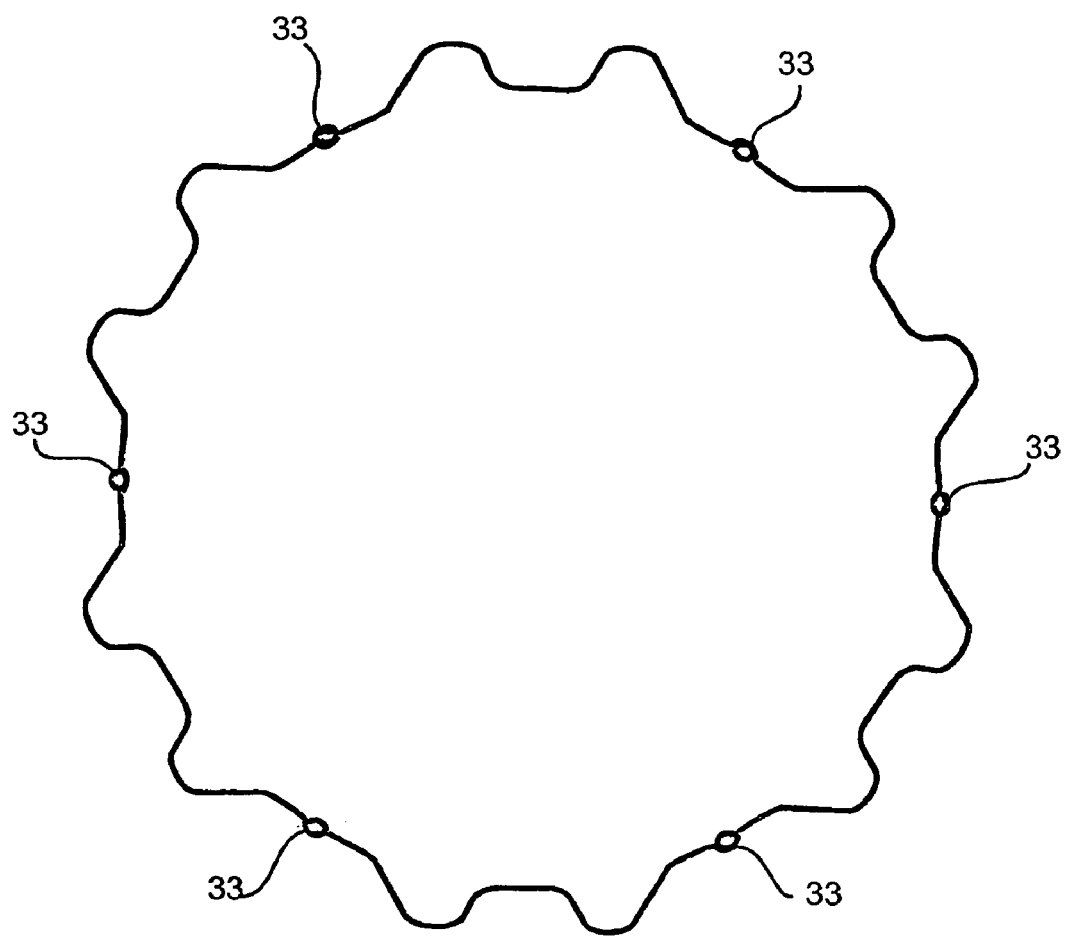
FIG. 12.

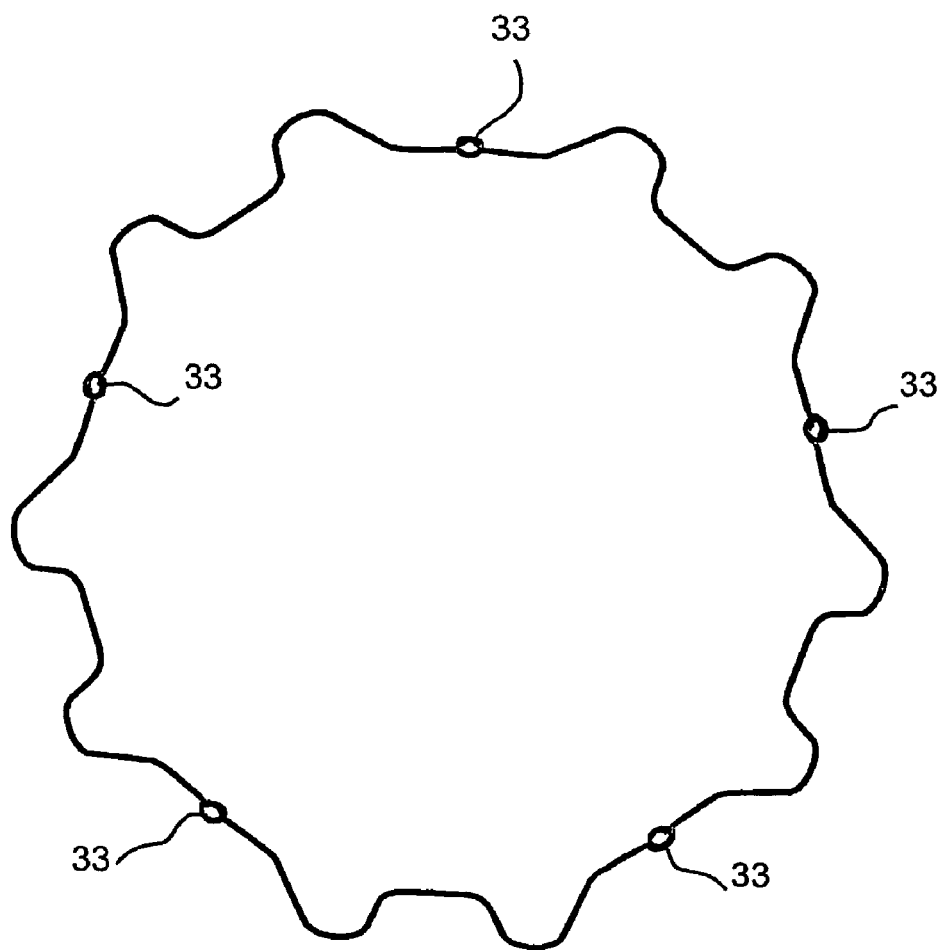
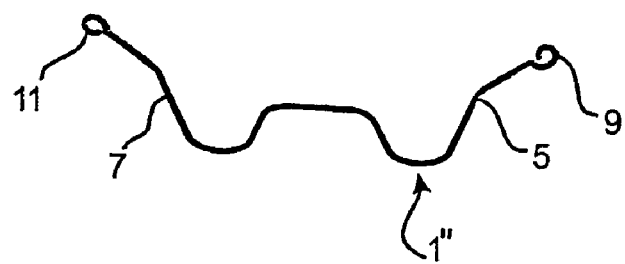
Fig. 13.

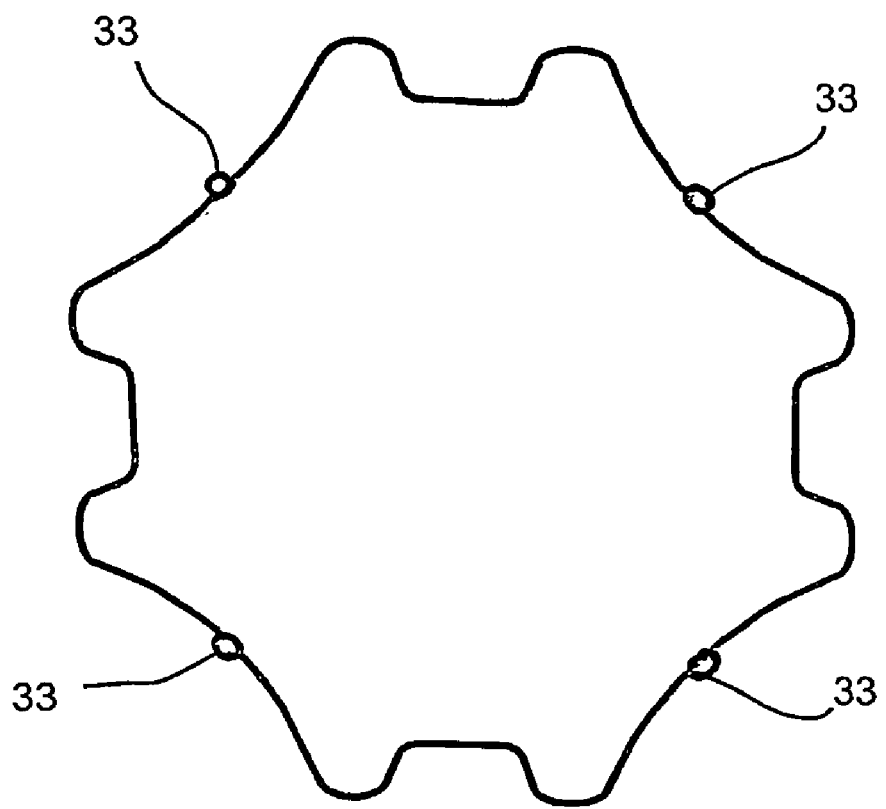
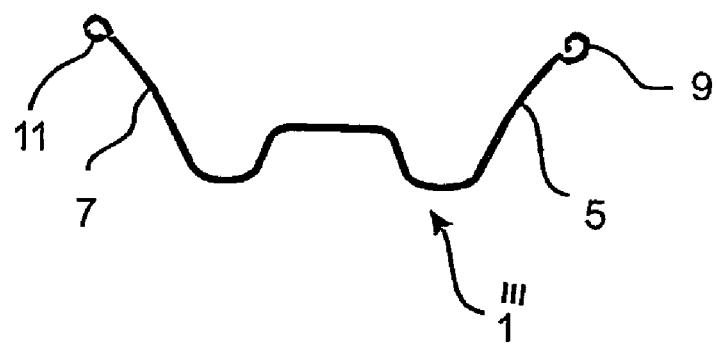
Fig. 14.

CONNECTOR

CROSS-REFERENCE TO RELATED APPLICATIONS

This application is an U.S. national phase application under 35 U.S.C. §371 based upon co-pending International Application No. PCT/AU03/00198 filed on Feb. 14, 2003. Additionally, this U.S. national phase application claims the benefit of priority of co-pending International Application No. PCT/AU03/00198 filed on Feb. 14, 2003, Australia Application No. 2002100117 filed on Feb. 14, 2002 and Australia Application No. 2002952080 filed on Oct. 16, 2002. The entire disclosures of the prior applications are incorporated herein by reference. The international application was published on Aug. 21, 2003 under Publication No. WO 03/069216.

FIELD OF THE INVENTION

This invention relates to a panel connector, a panel incorporating such a connector and an assembly of such panels.

The invention has been devised in particular, though not necessarily solely, for sheet piling to facilitate interconnection of sheet piling elements to form a sheet piling assembly.

BACKGROUND ART

A sheet pile's main function is to withstand sideways loading. Sheet piles are thus used to form retaining walls in various applications, including basement excavations, underground car parks, and cofferdams. Sheet piles may also be used in forming level roadways on embankments or for stabilising slope failures.

An advantage of sheet piles is that, owing to their relatively small cross sectional area, they may be driven into the ground either by means of a drop hammer or a vibratory hammer. Sheet piles, if adequate for a particular application, are often preferable to alternative forms of retaining wall which include contiguous bore piles, soldier bore piles with lagging and diaphragm walls. Use of sheet piles eliminates time consuming and costly site preparation work associated with the use of such alternatives and significantly reduces material costs.

Numerous difficulties may be encountered during manufacture and/or assembly of many existing types of sheet piling.

One such difficulty may arise during driving. Sheet piles are driven into the earth one by one, the sheet pile being driven being interconnected with an adjacent sheet pile driven before it. The end of the pile being driven may encounter changes in earth hardness or inclusions such as rocks and pebbles, which can cause it to deflect, thereby subjecting the connection it forms with the adjacent sheet pile to complex loading. Such loading may be in directions the connection is not equipped to cope with. This problem in particular may be encountered where the sheet piles have been cold rolled because such sheet piles can be provided only with relatively simple shaped connectors able to permit substantially unidirectional loading. Loading of the connectors of sheet piles in a direction with which they are not equipped to cope, particularly during driving, can cause the connections to jam. Where the loading is sufficiently high, the connectors may fail, by unhooking and/or deformation, thus causing the sheet piles to become disconnected.

The stiffness of a sheet pile assembly is largely related to its cross sectional depth in the direction of loading. For heavy duty applications, an assembly of sheet piles must be sufficiently deep in cross section to have the requisite stiffness to withstand the high sideways loads. Where sheet piles in the assembly are identical, this requires either that they individually have sufficient cross sectional depth or that they be able to be arranged at various angles with respect to each other in an assembly whilst still being able to transfer shear between each other in service. Conventional cold rolled sheet piles, as a result of the directional loading constraints on their connectors, must therefore be provided with differing cross sectional configurations. The need for more than one type of cold rolled sheet pile thus creates manufacturing complexity. Also, the abovementioned risks of jamming and disconnection during driving remain.

Some tolerance to misalignment during driving can be achieved by separate hot rolling manufacture of more elaborate connections which also are able to cope at least with a degree of the associated complex loading discussed above.

WO 00/08263 (Horan et al.) discloses a metal sheet pile which comprises a cold formed wall section of sheet material to the longitudinally extending side edges of which are secured hot formed clutch sections. The hot formed clutch sections may be produced by hot rolling or extrusion and must be secured to the cold formed wall sections by welding, bolting, riveting or other means. The requirement that these clutch sections be separately hot rolled represents a significant drawback because of the very high production costs associated with hot rolling. Hot rolling requires complex and extremely expensive plants and infrastructure. It is therefore not economical to produce hot rolled items in small volumes.

Furthermore, the need to manufacture the clutches separately and then fix them to the sheet pile side walls introduces manufacturing complexity and further expense.

The preceding discussion of the background to the invention is intended only to facilitate an understanding of the present invention. It should be appreciated that the discussion is not an acknowledgement or admission that any of the material referred to was part of the common general knowledge in Australia or elsewhere as at the priority date of the application.

DISCLOSURE OF THE INVENTION

In accordance with one aspect of the present invention, there is provided a panel connector for interconnecting adjacent panels, wherein the panels have one or more flanges each having an edge, the connector comprising a portion of sheet material arranged to extend from the edge of the panel with a curved profile having an inner end adjacent the edge of the panel and an outer end, such that in transverse cross section, said curved profile includes:

a first portion extending from the inner end in a generally elliptical path; and a second portion extending from the first portion to the outer end, the second portion curving inwardly from the generally elliptical path;

wherein the curved profile of the connector curves through at least 360 degrees, and the second portion defines an opening between the inner end and the outer end to receive a portion of a further connector on an adjacent panel of the same shape as said connector by longitudinally sliding the further connector within said connector.

It is a feature of the invention that when a load is applied to a pair of interengaged connectors, portions of an inner face of one connector engage with opposed portions of an outer face of the other connector and vice versa to cause the connectors to bindingly lock against each other to prevent disconnection.

The engagement of portions of the inner face of one connector with opposed portions of the outer face of the other connector under the tensile load causes deformation of the connectors to increase the degree of engagement between the opposed inner and outer faces which serves to further resist separation of the connectors.

When a torsional load is applied to the connection, portions of the opposed inner and outer faces of the connectors bind to interlock the connectors and thus to prevent disengagement.

The invention will be more fully understood in the light of the following description of one specific embodiment.

BRIEF DESCRIPTION OF THE DRAWINGS

The description is made with reference to the accompanying drawings of which:

FIG. 1A is a front perspective view of a sheet pile according to the embodiment;

FIG. 1B is a first side perspective view of the sheet pile of FIG. 1;

FIG. 1C is a rear perspective view of the sheet pile of FIG. 1;

FIG. 1D is a second side perspective view of the sheet pile of FIG. 1;

FIG. 2A is an end view of the sheet pile of FIG. 1 as seen from its first end;

FIG. 2B is an end view of the sheet pile of FIG. 1 as seen from its second end;

FIG. 8A is a detail end view of the connection as shown in FIG. 3C when unloaded;

FIG. 8B is a detail end view of the connection as shown in FIG. 3C but with the connected sheet piles rotated with respect to each other to a first end position;

FIG. 8C is a detail end view of the connection as shown in FIG. 3C but with the connected sheet piles rotated with respect to each other into a second end position;

FIG. 11A is an end view of the sheet pile according to the embodiment with ends of its flanges bent outwardly;

FIG. 11B is an end view of an assembly of sheet piles of the type shown in FIG. 11A;

FIG. 12 is an end view of a closed assembly formed by six sheet piles with their flanges bent outwardly but to a lesser extent than as shown in FIG. 11A (also showing the cross sectional configuration of the sheet piles in the assembly);

FIG. 13 is an end view of a closed sheet pile assembly comprising five sheet piles having their flanges bent outwardly to a lesser extent than as shown in FIG. 12 (also showing the cross sectional configuration of the sheet piles in the assembly).

FIG. 14 is an end view of a closed sheet pile assembly comprising four sheet piles having their flanges bent outwardly to a lesser extent than as shown in FIG. 13 (also showing the cross sectional configuration of the sheet piles in the assembly).

DETAILED DESCRIPTION OF THE SPECIFIC EMBODIMENT

Figure 2C:
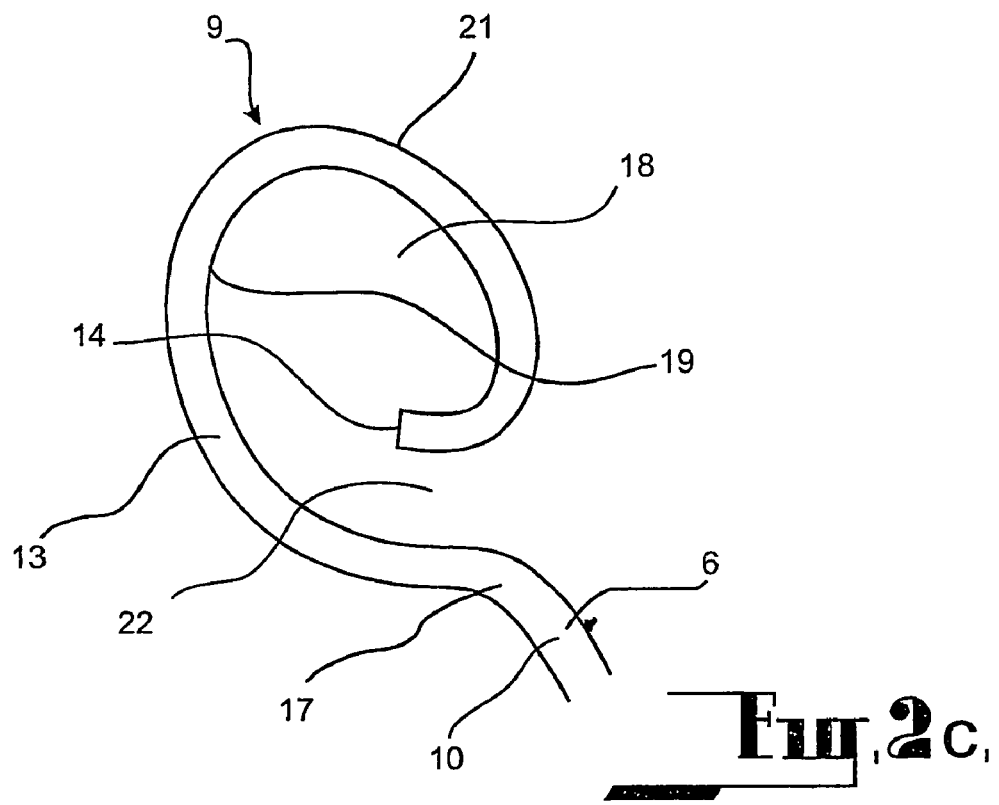
FIG. 2C is a detail view of a connector provided on one flange of the sheet pile of FIG. 1.

The panel according to the specific embodiment is a sheet pile 1, generally shown at FIGS. 1A to 1D, and in particular a thin walled sheet pile. The sheet pile 1 according to the embodiment is formed of a resiliently flexible material and, in particular, cold rolled from metal plate such as mild steel plate.

The sheet pile 1 according to the embodiment comprises a main body in the form of a channel section. The main body 2 (shown at FIGS. 2A and 2B) comprises a web 3 and opposed flanges 5 and 7 extending from the web to edges 6 and 8 respectively. The flanges 5 and 7 diverge from the web 3 to give the main body 2 a generally W-shaped configuration and thus to afford the sheet pile 1 increased transverse stiffness.

The edges 6 and 8 of the main body 2 according to the embodiment are substantially parallel.

In this embodiment, a middle portion of the web 3 is offset from the general plane of the web in the direction of the main body 2 to form a corrugation 4. The purpose of the corrugation 4 is to increase further the transverse stiffness of the sheet pile 1.

It is preferable that the transverse cross sectional configuration of the main body 2 be symmetrical. This is to give the main body 2 a centre of mass which is substantially coincident with its centre of shear, thereby to minimise torsional loading on the sheet pile 1 when in service.

Connectors 9 and 11 are located at the edges 6 and 8 of the flanges 5 and 7 respectively. Preferably the connectors 9 and 11 are formed integrally with the main body 2 as is the case with this embodiment.

Figure 2D:
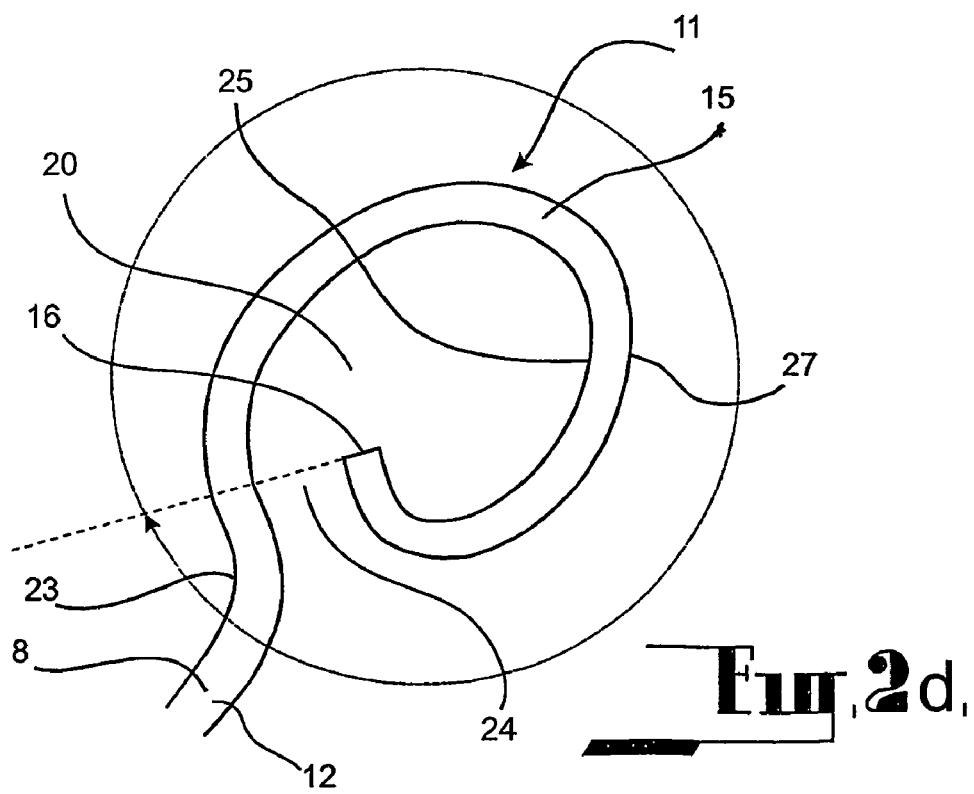
FIG. 2D is a detail view of a connector provided on the other flange of the sheet pile of FIG. 1.

The connectors 9 and 11, shown in detail at FIGS. 2C and 2D respectively, are of corresponding form, each having a curved profile.

The connector 9 has an inner end 10 located at the edge 6 of the main body 2. The connector 9 also has an outer end 14. The curved profile of the connector 9 defines a partially enclosed space 18 which is non-circular. In particular, the partially enclosed space 18 is generally elliptical. An opening 22 is defined between the inner and outer ends of the connector 9. The connector 9 has an inner face 19 and an outer face 21.

Correspondingly, the connector 11 is provided with an inner end 12 located at the edge 8 of the main body 2. The connector 11 has an outer end 16. The curved profile of the connector 11 also defines a partially enclosed space 20 which is generally elliptical. An opening 24 is defined between the inner and outer ends of the connector 11. The connector 11 also has inner and faces 25 and 27 respectively.

The connector 9 is also provided with a neck 17. The curvature of the neck 17 is opposite in sense to that of the curved profile 13 such that portions of the connector 9 are disposed to either side of a plane passing through the flange 5.

Correspondingly, the connector 11 is provided with a neck 23. The curvature of the neck 23 is opposite in sense to that of the curved profile 15, again such that portions of the connector 11 are disposed to either side of a plane passing through the flange 7.

As will become further apparent, an effect of the disposal of portions of the connectors 9 and 11 to either side of the edges 6 and 8 respectively is to reduce the cantilevering effect about the edges 6 and 8 when the respective connectors 9 and 11 are loaded in a transverse plane in operation.

The curved profile 13 of the connector 9 includes a first portion and a second portion. The first portion extends from the inner end 10 of the connector 9 and follows a generally elliptical path, as can be seen in FIGS. 2c and 2d. The first portion extends from the neck 17 along the generally elliptical path until at least a point where the path is directed back towards and parallel to the plane of the flange 5. The second portion extends from the first portion to the outer end 14. The second portion curves inwardly from the generally elliptical path to define the opening 22. The curved profile 13 curves through at least 360 degrees. Further, a central axis of the elliptical path parallel to the plane of the flange 5 but is offset in the direction that the neck 23. As can be seen in the embodiment shown in the Figures, said central axis parallel to the plane of the flange 5 is the major axis of the elliptical path.

The curved profile 15 of the connector 11 is the same shape as the curved profile 13 of the connector 9.

As mentioned previously, the connectors 9 and 11 are formed integrally with the main body 2, the inner ends 10 and 12 thus being coincident with edges 6 and 8 respectively. In an alternative embodiment, the connectors 9 and 11 may be formed separately from the main body 2 and attached at edges 6 and 8 by conventional fixing means.

As shown at FIGS. 2A and 2B, the opening 22 of connector 9 is located facing the main body 2 while the opening 24 of the other connector 11 faces away from the main body 2, the connectors 9 and 11 thus extending from edges 6 and 8 respectively of the main body 2 in the same rotational directions (shown as clockwise in FIGS. 2C and 2D). This allows the sheet pile 1 to be connected with a like sheet pile in two alternative ways, as will be described later.

In an alternative embodiment, where the sheet pile is intended to be connected to only one other sheet pile, a connector may be provided at only one of the edges 6 and 8.

As shown at FIGS. 2A and 2B, the connectors 9 and 11 in the case of this embodiment are small relative to the main body 2 so as to upset as little as possible the symmetry of the sheet pile 1, thus ensuring the centre of mass of the sheet pile 1 is close to the centre of shear of the sheet pile 1.

Each of the connectors 9 and 11 is interconnectable with the connector of a like sheet pile to form a connection adjoining the sheet piles wherein portions of the inner face of one connector are adapted to engage with opposed portions of the outer faces of the other connector and vice versa under load to cause the interconnected connectors to bindingly lock against each other to prevent disconnection of the sheet piles.

The curved profiles 13 and 15 of the connectors 9 and 11 respectively are such that the sheet pile 1 may be formed in its entirety and as a single piece from a single sheet of material through a cold forming procedure such as cold rolling. This is because the thickness of the sheet pile is uniform throughout. This is most advantageous because it allows for the connectors 9 and 11 to be integral with the main body 2 of the sheet pile 11 as is the case for this embodiment, thus eliminating the need for separate manufacture of the connectors 9 and 11 as well as the need to bolt, weld, rivet, or otherwise connect the connectors 9 and 11 to the flanges 5 and 7 respectively.

Figure 3A:
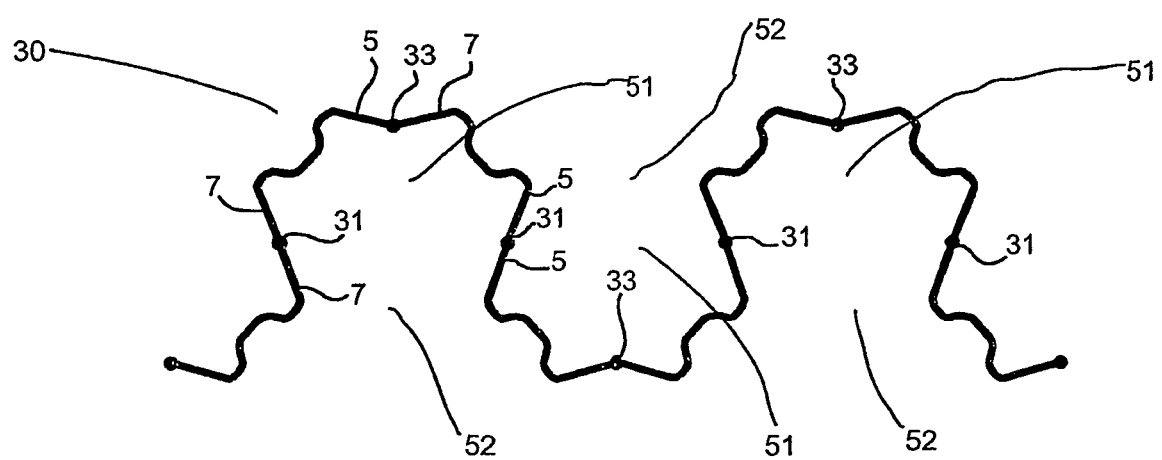
FIG. 3A is a plan view of an assembly of sheet piles according to the embodiment.

Shown in plan at FIG. 3A, is an example assembly 30 of sheet piles of the type shown in the preceding figures. Each of partially enclosed spaces 18 and 20 of connectors 11 and 13 respectively is configured and dimensioned to longitudinally receive another connector of corresponding form.

Figure 3B:
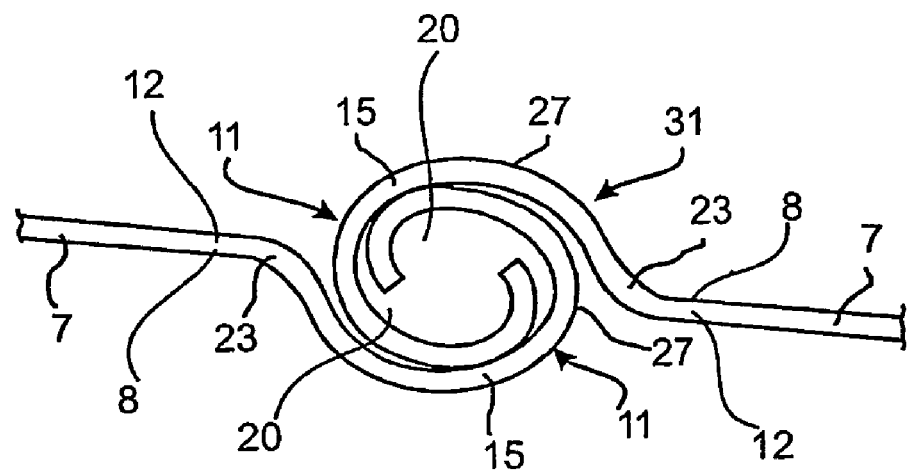
FIG. 3B is a detailed view of one form of connection formed between a pair of adjacent sheet piles according to the embodiment.
Figure 3C:
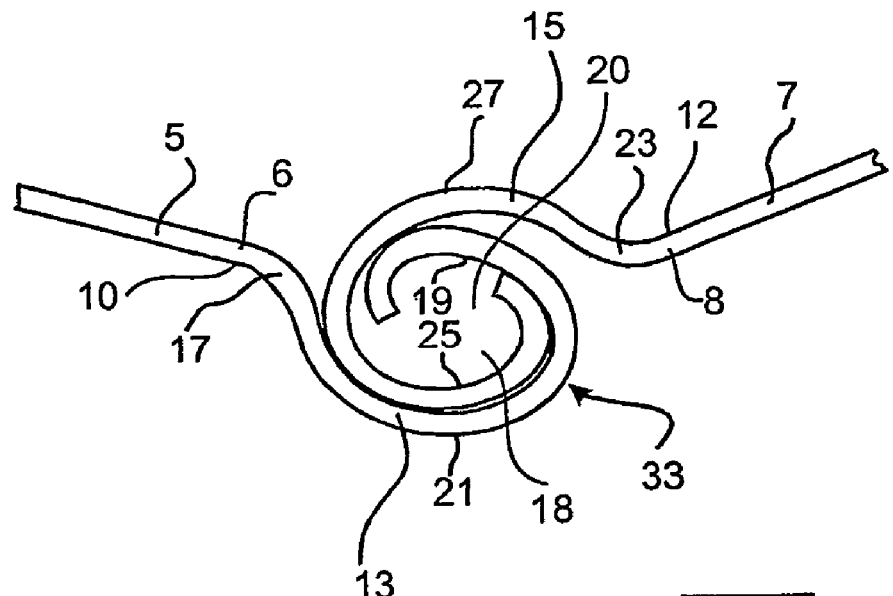
FIG. 3C is a detailed view of another form of connection between a pair of adjacent sheet piles according to the embodiment.

Each of the sheet piles 1 in the assembly 30 is connected to an adjacent sheet pile 1 by either a type-A connection 31 as shown in FIG. 3B or a type-B connection 33 as shown in FIG. 3C. The assembly 30, to be utilised for typical sheet piling applications, would be assembled by driving each component sheet pile 1 into the ground one after another. This is achieved by interconnecting the connector of an inserted pile, at its upper end, with the connector of the next pile to be inserted, at its lower end, to form a connection in the direction of which the next sheet pile is driven into the ground.

The connection must be able to tolerate complicated and heavy loading encountered by the sheet pile 1 during driving. Such loading is complicated for numerous reasons. In particular, where the end of a sheet pile encounters a change in the hardness of the earth through which it is being driven (such as at a boundary between sand and clay or due to an inclusion such as a rock), the effect may be to deform the driven sheet pile in a way which causes torsion, tension, compression, or particular combinations of such loads, at the type-A connection 31 or type-B connection 33. As will be shown later, each of connections 31 and 33 is able to withstand considerable tensile and compressive loads as well as to allow the interconnected piles to rotate with respect to each other about a longitudinal axis of the interengaged connectors in response to a load which would otherwise subject the connection 31 or 33 to a torsional stress.

The type-A connection 31 as shown in FIG. 3B is characterised by interconnection of like connectors; that is, by interconnection of connector 9 on one sheet pile and connector 9 on the other sheet pile or alternatively interconnection of connector 11 on one sheet pile and connector 11 on the other sheet pile (the latter being as shown in FIG. 3B). It can be seen in the type-A connection as shown in FIG. 3B that the flanges 7 of the connected sheet piles are approximately 180° apart.

The type-B connection 33 is characterised by interconnection of opposite connectors. This is illustrated at FIG. 3C where the interconnection is between connector 11 on one sheet pile connector 9 on the connecting sheet pile. It can be seen that the flange 7 is approximately 142° in a clockwise direction from flange 5.

It should be noted that the connections 31 and 33, as shown at FIGS. 3B and 3C respectively, reflect the arrangement of the connectors above ground. Below ground level, earth will typically occupy the area between the connectors and may become compressed between opposed inner and outer faces of the connectors in a loaded situation. However, the requisite load transfer between the connectors in the connections 31 and 33 may still be achieved in such conditions.

The detail of the connections 31 and 33 will be discussed further later, and with reference to FIGS. 7A to 7D and 8A to 8E.

Figure 4:
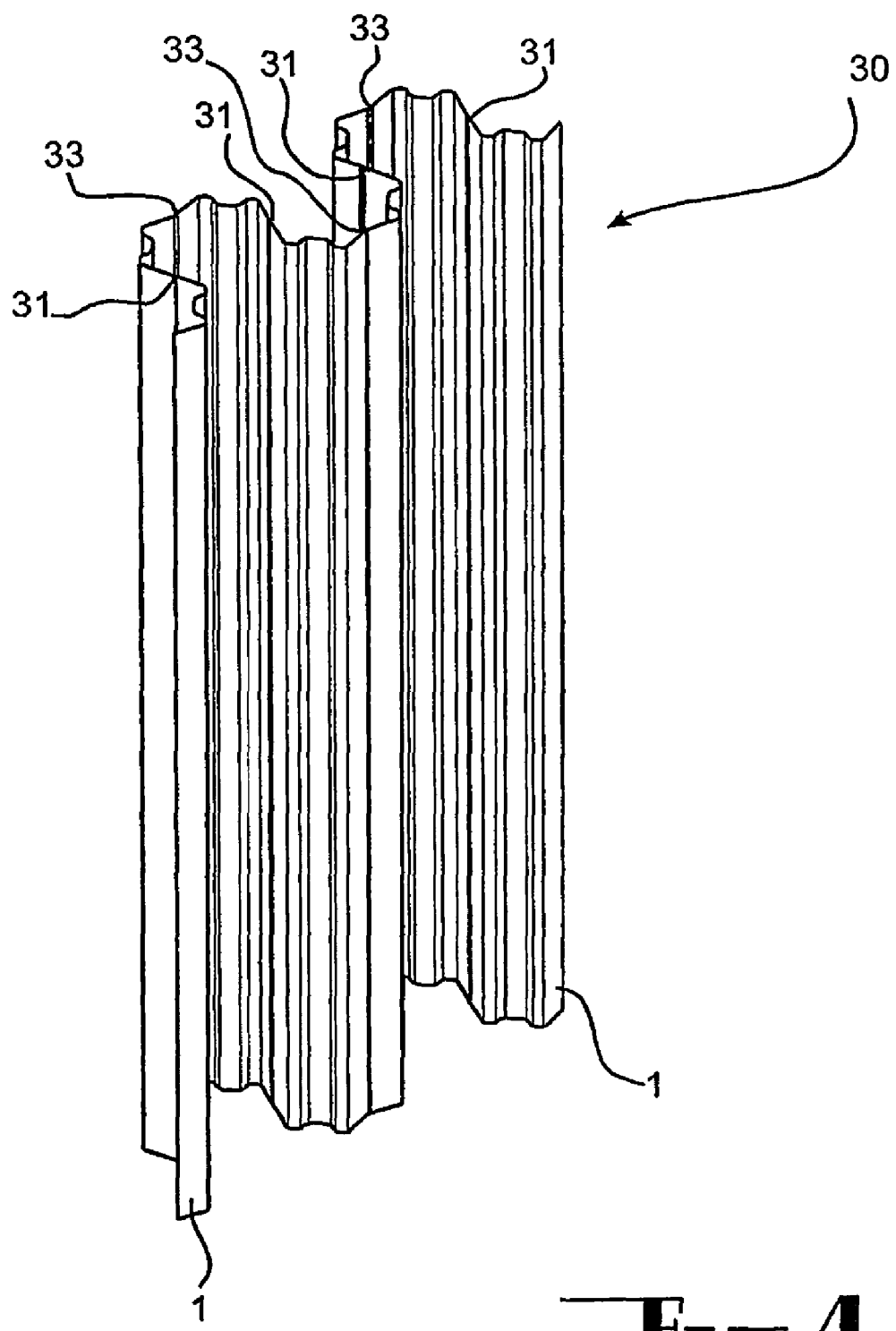
FIG. 4 is a perspective view of the sheet pile assembly shown in FIG. 3A.

A perspective view of the assembly 30 depicted in FIG. 3A is shown in FIG. 4. The length of the sheet piles is typically 12 to 15 meters for heavy duty retaining wall applications. However, in general, the sheet pile may vary in length from 2 meters to 20 meters. The thickness of the sheet pile may vary from 3 millimeters to 20 millimeters, though typically will fall within the range of 6 to 12 millimeters for thick-walled sheet piles and 4 to 6 millimeters for thin-walled sheet piles such as that according to this embodiment.

Figure 5:
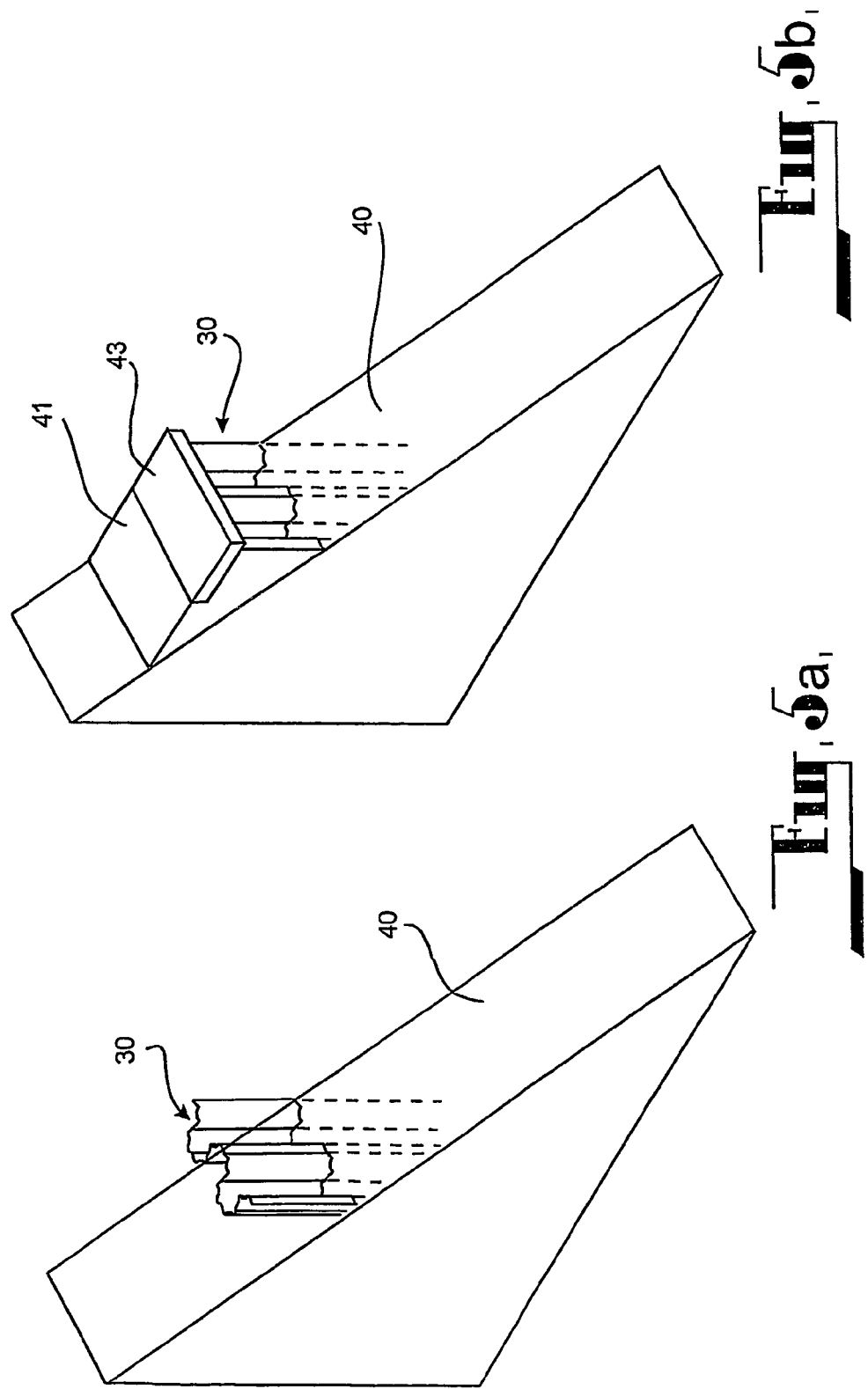
FIG. 5A is a schematic perspective view of an assembly of sheet piles as shown at FIGS. 3 and 4 driven into a slope.
FIG. 5B is a schematic perspective view of the sheet pile assembly of FIG. 5A in service.

FIG. 5A provides a schematic perspective view of the assembly 30 as formed by driving the sheet pile members one by one into the side of a slope 40. FIG. 5B depicts the assembly 30 then supporting a backfill 41, thus acting as a retaining wall. The assembly 30 may be capped with pile capping 43 to create useful area above the sheet piles such as is known in the art.

As will be described below, the connections 31 and 33 are able to allow the interconnected piles to rotate with respect to each other about a longitudinal axis of the interengaged connectors. This feature provides for an ability to create sheet pile assemblies having various cross sectional configurations and high section moduli, as well as providing interconnected adjacent sheet piles with an improved capacity to tolerate angular misalignment during driving without jamming or disconnecting.

Figure 7A:
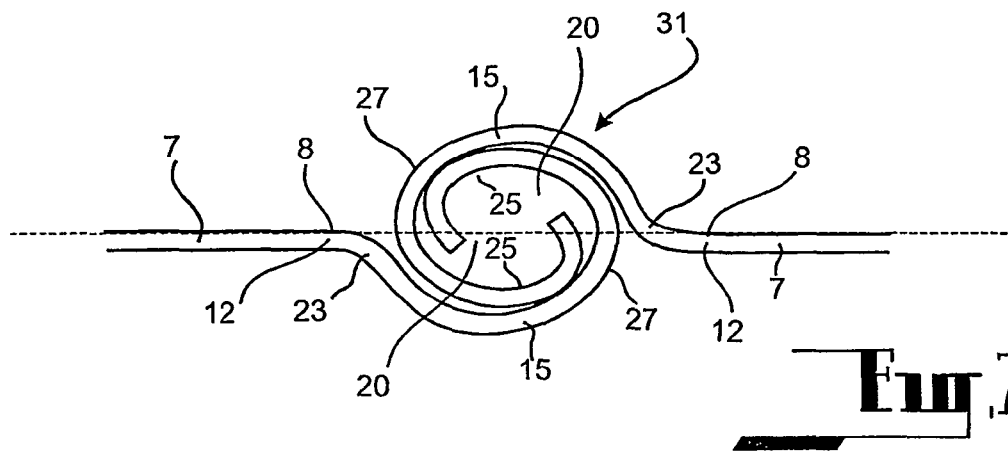
FIG. 7A is a detail end view of the connection of FIG. 3B when unloaded.

A further detail view of the type-A connection 31 is shown at FIG. 7A. It can be seen that the connection 31 is able to allow the respective inner faces 25 of each of the connectors 11 to move more closely together along an axis generally transverse to the plane defined by the flanges 7, and thus able to permit limited relative transverse movement between the connectors 11.

It can also be seen in FIG. 7A that, if the inner faces 25 are moved slightly more closely together, in the manner described above, the connectors 11 will no longer be in physical contact and the connection 31 thus becomes able to permit relative transverse movement between the connectors 11 along a plurality of axes transverse to the longitudinal axis of the edges 8.

The ability of the connection 31 to permit limited relative transverse movement between the connectors 11 may assist in tolerating translational misalignment in a generally transverse plane during driving and thus also can help to prevent jamming of one connector with the other connector in the type-A connection 31 as well as possible damage to the type-A connection 31 which might otherwise result therefrom.

Figure 7B:
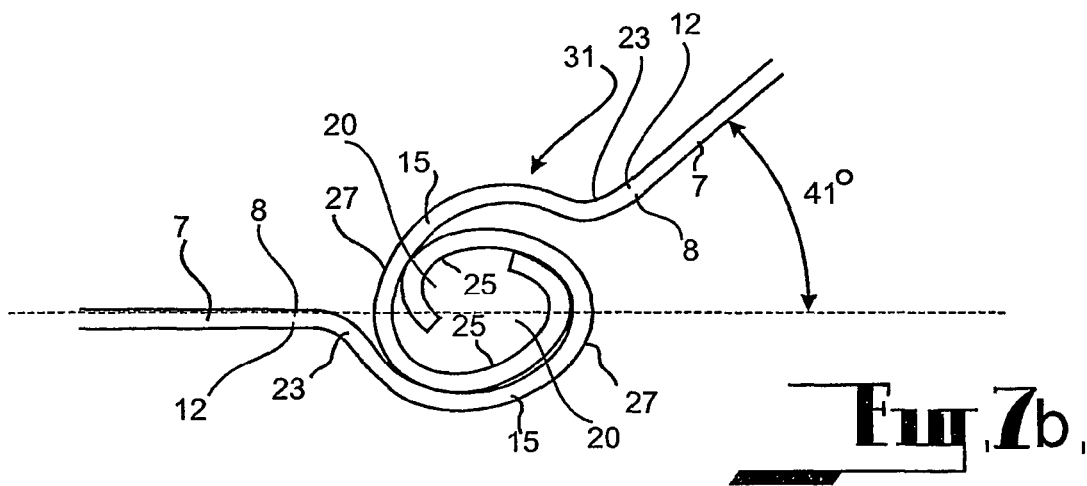
FIG. 7B is a detail end view of the connection of FIG. 3B with the connected sheet piles rotated with respect to each other into a first end position.

As shown at FIG. 7B the sheet pile on the right of the type-A connection 31 may be rotated, relative to the sheet pile on the left of the type-A connection 31, through a maximum of approximately 41° in an anticlockwise direction, about a longitudinal axis of the interengaged connectors, from the position it occupies as shown at FIG. 7A.

Figure 7C:
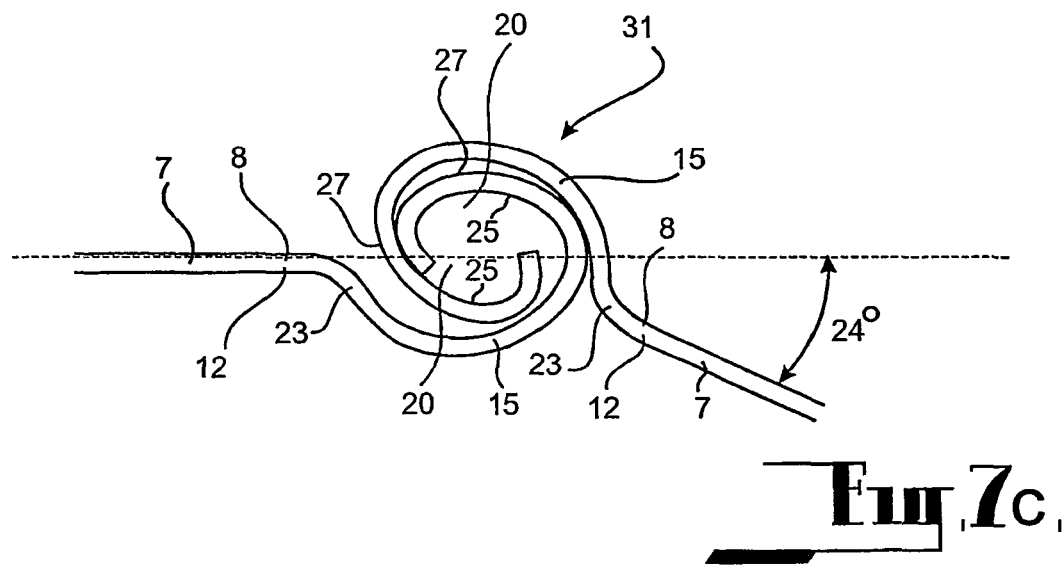
FIG. 7C is a detail end view of the connection as shown in FIG. 3B with the connected sheet piles rotated with respect to each other into a second end position.

As shown at FIG. 7C, the sheet pile on the right of the type-A connection 31 may be rotated, relative to the sheet pile on the left of the type-A connection 31, through a maximum of approximately 24° in a clockwise direction, about a longitudinal axis of the interengaged connectors, from the position it occupies as shown at FIG. 7A.

Under the action of a torsional load, further relative rotation of the sheet piles beyond the maximum angular orientations shown in FIGS. 7B and 7C is precluded because the generally elliptical shape of the curved profiles 15 result in portions of the opposed faces of the connectors binding to interlock the connectors. This binding action also helps prevent disengagement.

Figure 7D:
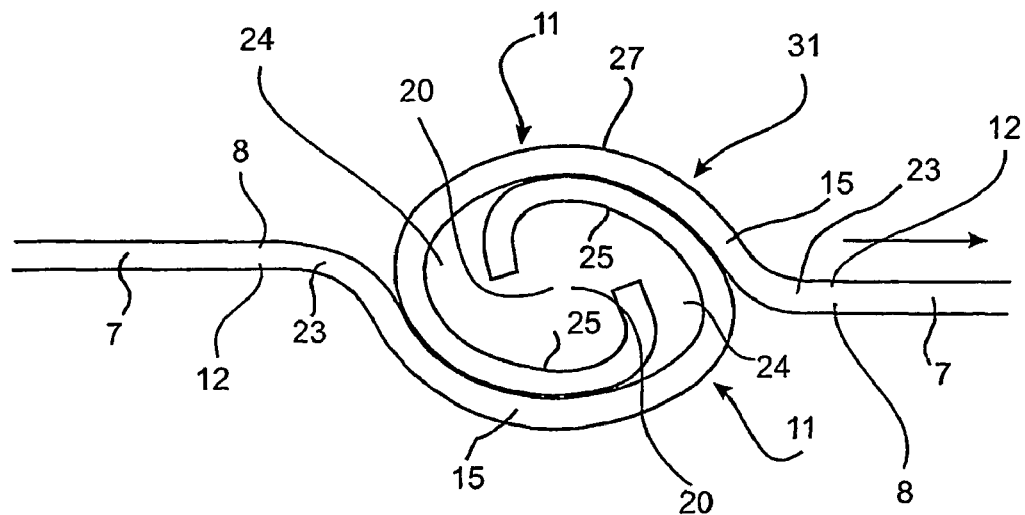
FIG. 7D is a detail end view of the connection as shown in FIG. 3B when in tension.
Figure 7E:
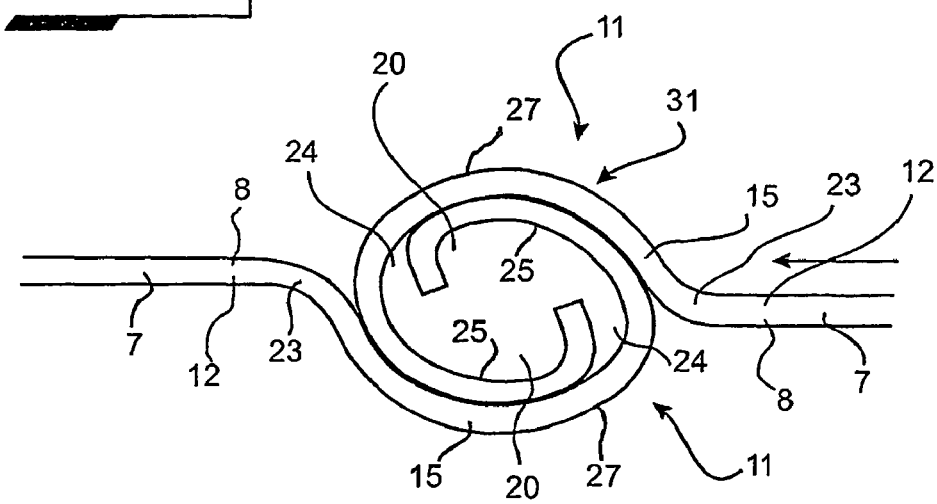
FIG. 7E is a detail end view of the connection as shown in FIG. 3B when in compression.

A detail view of the type-A connection 31 in tension is shown at FIG. 7D. Portions of the inner face of one connector engage with opposed portions of the outer face of the other connector and vice versa under load to cause the connectors to bind and thus to lock against each other to prevent disconnection. A detail view of the type-A connection 31 in compression is shown at FIG. 7E. Portions of the inner face of one connector engage with opposed portions of the outer face of the other connector and vice versa under load to cause the connectors to bind and thus to lock against each other to prevent disconnection.

As described previously, the central axis of the elliptical path of each of the connectors 9 and 11 parallel to the flanges 7 is offset in the direction of the neck 23. In the configuration shown in FIGS. 7*d* and 7*e*, the central axis of the elliptical paths of each of the connectors 11 are therefore generally aligned and located between the planes defined by the flanges 7. This has the effect that when under compression as shown in FIG. 7*e*, the connectors 9 and 11 tend to rotate inwardly and bind together, rather than rotate outwardly and open up, which would cause disengagement of the connectors 11.

Further, during this compression, due to the curved profile extending through 360 degrees, the second portion of the connector 11 is forced into engagement with the inner face of the other connector 11 adjacent the point where the outer face of the other connector 11 engages with the inner face of the connector 11 adjacent the neck 23. The same type of engagement occurs at the second portion of the connector 11 resulting in the connectors 11 engaging and binding at more than two points (in this case at four points). This engagement allows significant force to be transferred across the connectors 9 and 11 in this type of engagement. As can be seen in FIG. 3*a*, the orientation of the connection of this type is generally transverse to the plane of the sheet pile assembly, requiring it to be sufficiently resistant to such forces.

A further detail view of the type-B connection 33 is shown at FIG. 8A. There is little or no relative transverse movement possible between the connectors 11 though this is merely a consequence of the angular orientation of the interconnecting sheet piles in the example assembly shown in FIG. 3A. If the sheet piles are rotated relative to each other so as to bring the general planes of interconnected flanges 5 and 7 more closely into alignment, the respective inner faces 19 and 25 become able to move more closely together along an axis generally transverse to the flanges 5 and 7, and thus able to permit limited relative transverse movement between the connectors 9 and 11 respectively. If the inner faces 19 and 25 are then moved slightly more closely together, in the manner just described, the connectors 9 and 11 will no longer be in physical contact and the connection 33 thus becomes able to permit relative transverse movement between the connectors 9 and 11 along a plurality of axes transverse to the edges 6 and 8.

The ability of the connection 33 to permit limited relative transverse movement between the connectors 9 and 11 may assist in tolerating translational misalignment in a generally transverse plane during driving and thus also can help to prevent jamming of one connector with the other connector in the type-B connection 33 as well as possible damage to the type-B connection 33 which might otherwise result therefrom.

As shown at FIG. 8B the sheet pile on the right of the type-B connection 33 may be rotated, relative to the sheet pile on the left of the type-B connection 33, through a maximum of approximately 4° in an anticlockwise direction, about a longitudinal axis of the interengaged connectors, from the position it occupies as shown at FIG. 8A.

As shown at FIG. 8C, the sheet pile on the right of the type-B connection 33 may be rotated, relative to the sheet pile on the left of the type-B connection 33, through a maximum of approximately 61° in a clockwise direction, about a longitudinal axis of the interengaged connectors, from the position it occupies as shown at FIG. 8A.

Under the action of a torsional load, further relative rotation of the sheet piles beyond the maximum angular orientations shown in FIGS. 8B and 8C is precluded due to the generally elliptical shape of the curved profile causing portions of the opposed faces of the connectors to bind to interlock the connectors. This binding action also helps prevent disengagement.

Figure 8D:
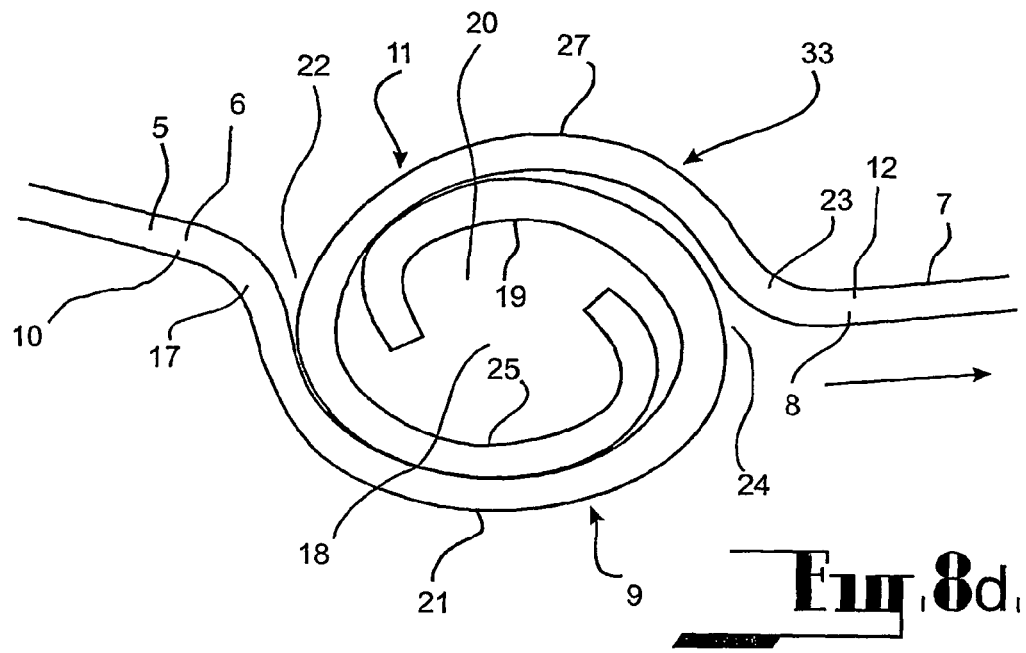
FIG. 8D is a detail end view of the connection as shown in FIG. 3C when in tension.
Figure 8E:
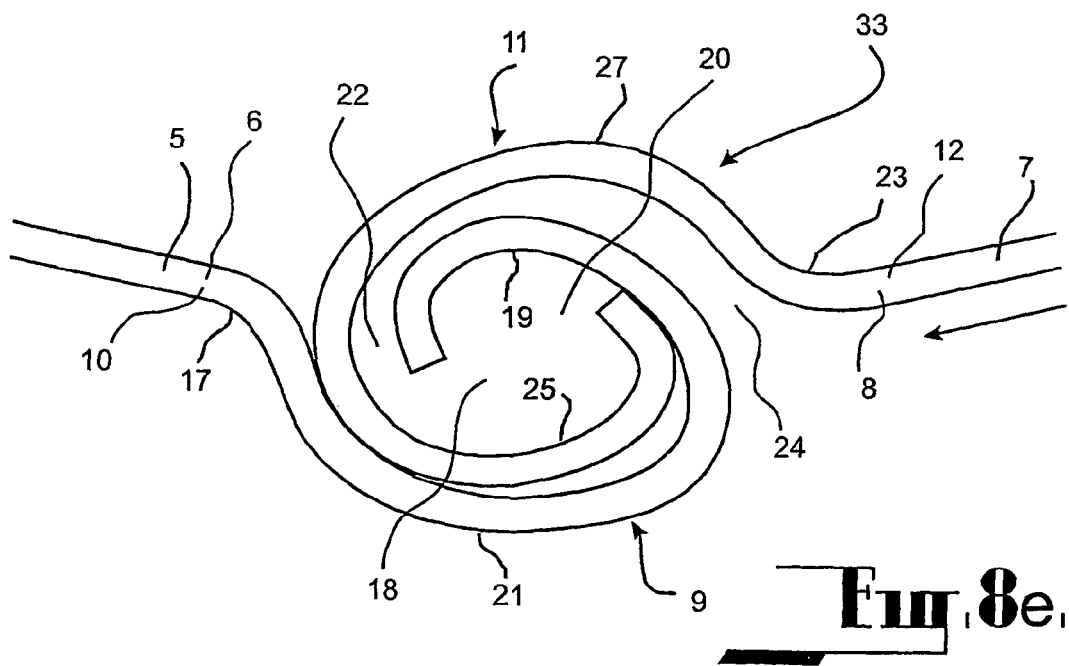
FIG. 8E is a detail end view of the connection as shown in FIG. 3C when in compression.
Figure 9A:
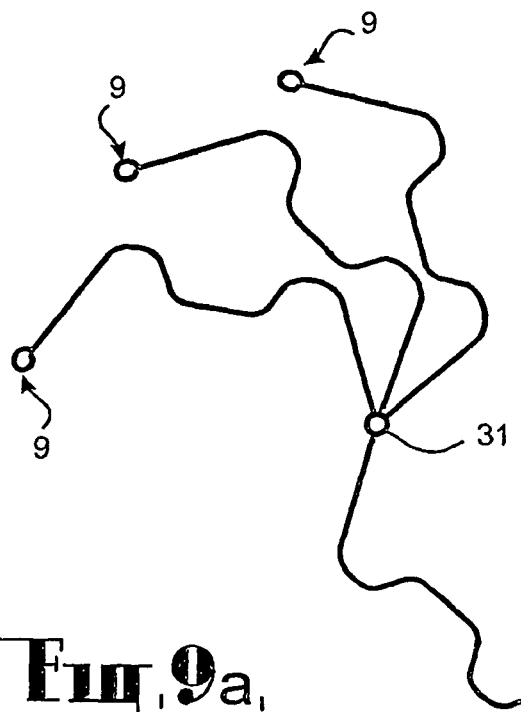
FIG. 9A is an end view showing the possible end positions of sheet piles connected as shown at FIG. 3B.

A detail view of the type-B connection 33 in tension is shown at FIG. 8D. Portions of the inner faces of one connector engage with opposed portions of the outer faces of the other connector and vice versa under load to cause the connectors to bind and thus to lock against each other to prevent disconnection in a manner similar to that described for the type-A connection 31. A detail view of the type-B connection 33 in compression is shown at FIG. 8E. Portions of the inner faces of one connector engage with opposed portions of the outer faces of the other connector and vice versa under load to cause the connectors to bind and thus to lock against each other to prevent disconnection in a manner similar to that described for the type-A connection 31. FIG. 9A shows the orientations of the sheet piles about type-A connection 31, as depicted FIGS. 7A, 7B and 7C, superimposed. Correspondingly, FIG. 9B shows the orientations of the sheet piles about type-B connection 33, as depicted FIGS. 8A, 8B and 8C, superimposed.

It is a feature of the connectors 9 and 11 that opposing faces of the interconnecting connectors are able to bind and thus to lock against each other in response to a tensile or compressive load applied to either connection 31 or 33, with the connected sheet piles adopting any orientation between and including the extreme orientations thereby to prevent disconnection. The connections 31 and 33 are thus able to transfer shear thereacross, in both compression and tension, in a wide variety of assemblies, the assembly 30 shown at FIG. 3A, being only one example of many. Owing to this ability, the connections 31 and 33 may be subjected to complex loading without failing. Assemblies with relatively deep cross sectional configurations therefore have high associated section moduli and are thus able to be used in heavy duty retaining wall applications.

Figure 9B:
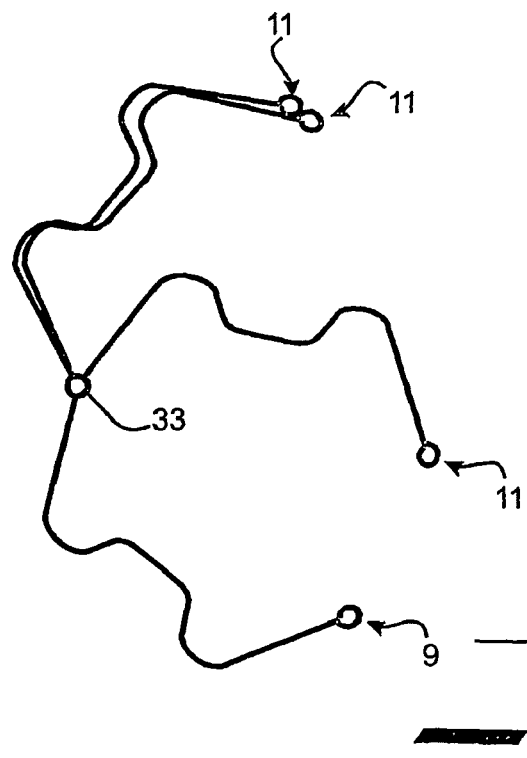
FIG. 9B is an end view showing the possible extreme orientations of sheet piles connected as shown at FIG. 3C.

As best illustrated at FIGS. 7D, 7E and 8D, it is a further feature of each of connectors 9 and 11 that, for particular orientations of the sheet piles within the ranges illustrated in FIGS. 9A and 9B, engagement of portions of the inner faces thereof with opposed portions of the outer faces of the other connector and vice versa occurs at both sides of the general plane of each flange adjacent the connection. This is a consequence of the provision of the necks 17 and 23 which causes the curved profiles 13 and 15 respectively to be almost centred about the general planes of the respective flanges 5 and 7 with which they are associated. With this configuration, the bending moments, about each neck, caused by such engagement can be in opposite rotational directions and the resultant cantilever effect about the respective necks may thus be small.

As mentioned above, the ability of the connections 31 and 33 to permit relative rotation of the interconnected sheet piles about a longitudinal axis of the interengaged connectors allows for the formation of sheet pile assemblies having variable cross sectional configurations wherein adjacent sheet piles are positioned at various angles. An example of such an assembly is the assembly 30 shown at FIG. 3A. In particular, it is possible to create sheet pile assemblies with deep cross sectional configurations and therefore high section moduli. The variability of the cross sectional configuration of an assembly is further increased as a result of the ability for sheet piles to be connected to form either of the two alternative types of connection, type-A or type-B.

An advantage owing to both the ability of the sheet pile 1 to be assembled in two different ways, i.e. connected by either type-A or type-B connections, and the ability of each of those types of connection to permit relative rotation of the interconnected sheet piles about a longitudinal axis of the interengaged connectors, is that significant variability in the cross sectional configuration of an assembly can be achieved using identical sheet piles of the type having the configuration of the sheet pile described. This advantage in particular simplifies the manufacturing process.

Figure 10A:
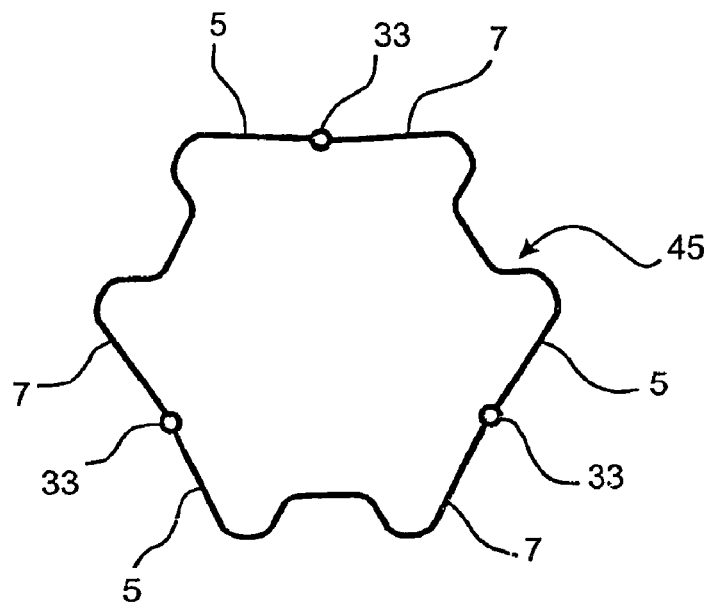
FIG. 10A is an end view of a closed assembly formed by three sheet piles according to the embodiment.

In addition to the assembly 30 shown at FIG. 3A, which has a large section modulus whilst comprising connections 31 and 33 having an ability to transfer shear thereacross, closed assemblies such as the assembly 45, shown at FIG. 10A, formed by three sheet piles 1 interconnected by connection types 33 are also possible. Such closed assemblies may be used in more specialised applications, such as cofferdams and caissons wells.

Figure 10B:
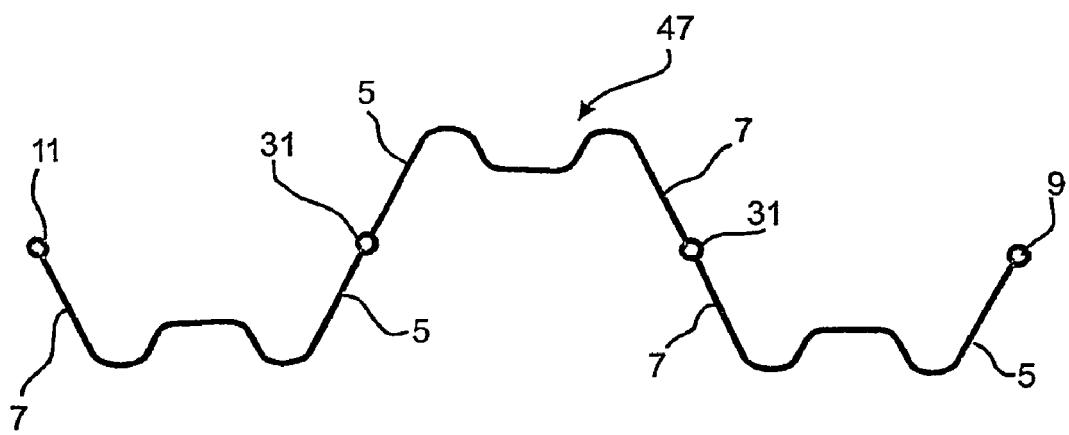
FIG. 10B is an open assembly formed by three sheet piles according to the embodiment.

Whilst the sheet piles 1 may be arranged at varying angles to form assemblies having deep cross sectional configurations, they may also be arranged in assemblies having shallower cross sectional configurations, such as for example the assembly 47 shown in FIG. 10B. The assembly 47 may be desirable in an application where the section modulus need not be as high and space able to be occupied by the depth of the cross sectional configuration of the assembly is limited. An example of such an application is basement excavation where such space constraints are common.

Figure 6:
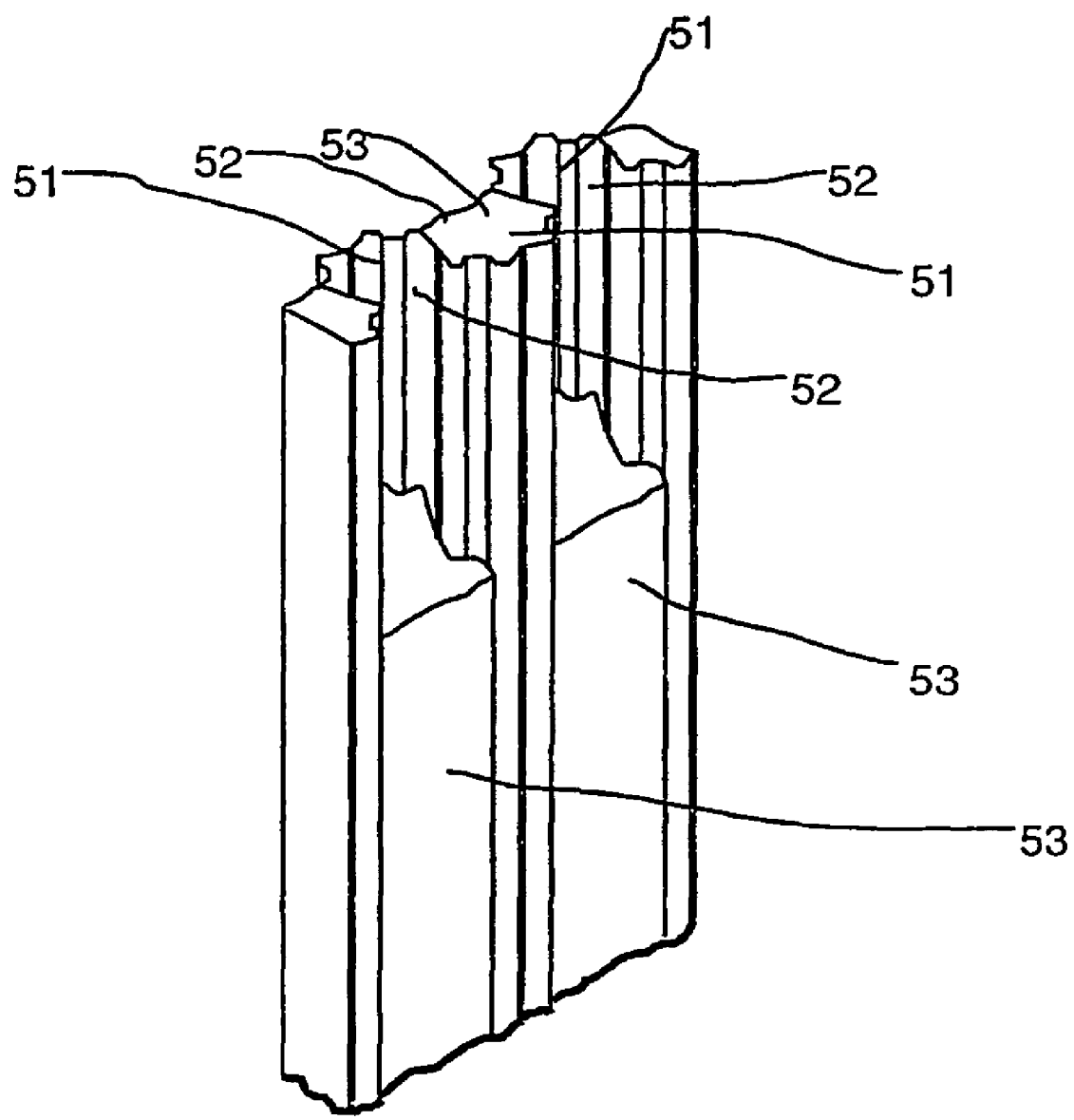
FIG. 6 is a perspective view of the sheet pile assembly of FIGS. 5A and 5B showing the assembly engaging the earth into which is has been installed.

FIG. 6 depicts the sheet pile assembly 30 engaging the earth into which is has been installed. The interconnected sheet piles 1 are arranged to form cavities 51 extending parallel with the connections 31 and 33 (also shown at FIG. 3a). The assembly 30 also comprises mouths 52 extending parallel with the cavities 51 and providing access thereto. The mouths 52 are narrower than the respective cavities 51.

The cavities thus entrap and engage respective columns of earth 53 thereby deriving transverse reinforcement therefrom and affording the assembly a large integral mass. The installed assembly 30 is thus able to act as both a composite conventional mass gravity retaining wall and also as a flexural sheet pile wall.

A further feature of an assembly of sheet piles according to the embodiment is that when a flexural bending load is applied to either of the type-A and type-B connections 31 and 33, the connection locks preventing the piles from relative longitudinal displacement. The connection is thus able to transmit both transverse and longitudinal shear forces when in service with little or no relative slippage of the connectors therein. As a result, the assembly behaves as a single piece with a consequently high section modulus.

A further feature of the sheet pile 1 according to the preferred embodiment is an ability of the flanges 5 and 7 to be bent outwardly from the main body 2, as shown at FIG. 11A. As will be described below, the bending may be carried out to varying degrees.

An open assembly formed of sheet piles having the configuration shown in FIG. 11A and connected by type-B connections 33 is shown at FIG. 11B. FIGS. 12, 13 and 14 show closed assemblies, enclosing a progressively reducing cross sectional area, formed from six, five and four identical sheet piles respectively. In each of these figures, the cross sectional configuration of the sheet piles is also shown separately from the closed assembly which they form. It can be seen that the flanges of the sheet piles 1', 1" and 1''' shown in FIGS. 12, 13 and 14 respectively are outwardly bent to a progressively lesser extent.

It should be understood that engagement between portions of radial faces as referred to herein may comprise direct or indirect engagement. Indirect engagement may occur, for example, where there is a layer of soil or other debris trapped between the engaging portions.

Throughout the specification, unless the context requires otherwise, the word "comprise" or variations such as "comprises" or "comprising", will be understood to imply the inclusion of a stated integer or group of integers but not the exclusion of any other integer or group of integers.

It should be appreciated that the scope of the present invention need not be limited to the particular scope of the embodiments described above.

The claims defining the invention are as follows:

1. A panel connector for joining at least two panels together, comprising:
    an inner end located at an edge of a flange of a panel enabling said connector to extend outwardly from said edge of said panel;
    an outer end located opposite of said inner end of said connector;
    a radial inner face and a radial outer face;
    an inner portion and an outer portion, said inner and outer portion of said connector defining an opening therebetween;
    wherein said connector having a curved profile defining a partially enclosed space therein, said partially enclosed space being configured and dimensioned to longitudinally receive another connector of corresponding form; and
    wherein at least a portion of said radial inner face of a first connector of a first panel is able to engage with at least a portion of said radial outer face of a second connector of a second panel, and wherein at least a portion of said radial inner face of said second connector is able to engage with at least a portion of said radial outer face of said first connector, thereby preventing disengagement of said first and second connectors throughout a plane transverse to said edge whilst permitting relative longitudinal displacement of a pair of interengaged connectors;
    wherein said second connector extending from an edge of said second panel in the same rotational direction of said first connector, said second connector being of corresponding form of similar shape to said first connector;
    wherein a central axis of said partially enclosed space of said connector is parallel to the plane of said flange, and located between the planes defined by flanges of said first and second connectors.

2. The panel connector as of claim 1, wherein said panel further comprising an additional connector located at an edge of an additional flange opposite said flange of said panel enabling said additional connector to extend outwardly from said edge of said additional flange in an orientation corresponding with said connector, said additional connector being of corresponding form to said connector.

3. The panel connector as of claim 2, wherein each of said connector and said additional connector of said panel further comprising a neck, said neck each having a curvature opposite of said curved profile turning through 360 degrees such that portions of said connector are disposed to either side of a plane passing through said flange of said panel respectively.

4. The panel connector as of claim 3, wherein said central axis of said partially enclosed space of each of said connector and said additional connector parallel to said flanges respectively is offset in a direction of said neck, and wherein said central axis of said partially enclosed space of each of said interengaged connectors are therefore generally aligned and located between the planes defined by said flanges respectively when said flanges of said first and second panels are aligned on the same axis.

5. The panel connector as of claim 4, wherein said partially enclosed space of said connector is generally elliptical, and said generally elliptical shape being configured so during compression of said integrated connectors, when said central axis of said partially enclosed space of said integrated connectors are parallel, said outer portion of said first connector is forced into engagement with said inner face of said second connector adjacent where said outer face of said second connector engages with said inner face of said first connector adjacent said neck of said second connector and said outer portion of said second connector is forced into engagement with said inner face of said first connector adjacent where said outer face of said first connector engages with said inner face of said second connector adjacent said neck of said first connector.

6. The panel connector as of claim 1, wherein said curved profile configuration of said connector is such that it will be symmetrical about the axis extending between said inner ends of said interengaged connectors.

7. The panel connector as of claim 1, wherein said connector having a configuration such that said interengaged connectors are capable of relative rotation about a longitudinal axis of said interengaged connectors.

8. The panel connector as of claim 7, wherein said limited transverse movement is along at least one transverse axis throughout 65 degrees rotation except at the extreme angular rotations.

9. A panel and panel connector system comprising:
    a panel having at least one edge of a flange;
    at least one connector located along at least a portion of said edge, said connector having an inner end located at said edge of said panel enabling said connector to extend outwardly from said edge of said panel, an outer end located opposite of said inner end of said connector, a radial inner face and a radial outer face, and an inner portion and an outer portion, said inner and outer portion of said connector defining an opening therebetween;
    wherein said connector having a curved profile defining a partially enclosed space therein, said partially enclosed space being configured and dimensioned to longitudinally receive another connector of corresponding form;
    wherein at least a portion of said radial inner face of a first connector of a first panel is able to engage with at least a portion of said radial outer face of a second connector of a second panel, and wherein at least a portion of said radial inner face of said second connector is able to engage with at least a portion of said radial outer face of said first connector, thereby preventing disengagement of said first and second connectors throughout a plane transverse to said edge whilst permitting relative longitudinal displacement of a pair of interengaged connectors; and wherein said connector further comprising a neck, said neck having a curvature opposite of said curved profile turning through 360 degrees such that portions of said panel connector are disposed to either side of a plane passing through said flange of said panel;

wherein said second connector extending from an edge of said second panel in the same rotational direction of said first connector, said second connector being of corresponding form to said first connector;

wherein a central axis of said partially enclosed space of said connector is parallel to the plane of said flange, said central axis of said partially enclosed space of each of said interengaged connectors are therefore generally aligned and located between the planes defined by said flanges respectively when said flanges of said first and second panels are aligned on the same axis.

10. The panel and panel connector system as of claim 9, wherein said panel having a pair of edges, wherein said connector being located along at least a portion of each edge.

11. The panel and panel connector system as of claim 10, wherein said edges are substantially parallel, and wherein said curved profile of said panel connectors each include a first portion and a second portion, said first portion extending from said inner end of said connector and follows a generally elliptical path until at least a point where the path is directed back towards and parallel to the plane of said flange, said second portion extending from said first portion to said outer end of said connector and which curves inwardly from said generally elliptical path to define said opening.

12. The panel and panel connector system as of claim 9, wherein said panel is formed from the group consisting of a resiliently flexible material and a metallic sheet material.

13. The panel and panel connector system as of claim 9, wherein said panel is fabricated from the group consisting of cold forming and cold rolling.

14. The panel and panel connector system as of claim 9, wherein said panel is selected from the group consisting of a sheet pile and a channel section.

15. The panel and panel connector system as of claim 9, wherein said opening of said connector located on said edge is located to the opposite face of said panel to said opening of a second connector located on a second edge of said panel opposite of said connector.

16. The panel and panel connector system as of claim 9, wherein said panel is capable of being deformed about at least one longitudinal axis.

17. The panel connector as of claim 9, wherein said connector having a configuration such that said interengaged connectors are capable of relative rotation about a longitudinal axis of said interengaged connectors.

18. The panel connector as of claim 9, wherein said connector is formed integrally with said panel.

19. The panel connector as of claim 9, wherein said panel having a cross sectional profile such that the center of shear of said panel is adjacent to said center of mass of said panel.

20. A sheet pile assembly comprising:
at least two panels, said panels each having at least one edge of a flange;
at least one connector located along at least a portion of said edge of said panels, said connector having an inner end located at said edge of said panel enabling said connector to extend outwardly from said edge of said panel, an outer end located opposite of said inner end of said connector, a radial inner face and a radial outer face, and an inner portion and an outer portion, said inner and outer portion of said connector defining an opening therebetween;
wherein said connector having a curved profile defining a partially enclosed space therein, said partially enclosed space being configured and dimensioned to longitudinally receive another connector of corresponding form; and
wherein at least a portion of said radial inner face of a first connector is able to engage with at least a portion of said radial outer face of said second connector, and wherein at least a portion of said radial inner face of said second connector is able to engage with at least a portion of said radial outer face of said first connector, thereby preventing disengagement of said first and second connectors throughout a plane transverse to said edge whilst permitting relative longitudinal displacement of said interengaged connectors;
wherein a central axis of said partially enclosed space of each of said connectors is parallel to the plane of said flange, said central axis of said partially enclosed space of each of said interengaged connectors are therefore generally aligned and located between the planes defined by said flanges respectively when said flanges of said panels are aligned on the same axis.

* * * * *